United States Patent [19]

McBrayer et al.

[11] 4,384,052
[45] May 17, 1983

[54] POLYURETHANES PRODUCED FROM AN ADDUCT OF AN ORGANIC POLYISOCYANATE AND CERTAIN AMINES

[75] Inventors: Robert L. McBrayer; John G. Demou, both of Lincoln Park; Peter T. Kan, Plymouth, all of Mich.; William E. Volz, Baton Rouge, La.

[73] Assignee: BASF Wyandotte Corporation, Wyandotte, Mich.

[21] Appl. No.: 271,807

[22] Filed: Jun. 8, 1981

[51] Int. Cl.$^3$ ................ C08G 18/14; C08G 18/77
[52] U.S. Cl. ................................... 521/162; 521/904; 528/59; 528/64; 528/68; 528/44
[58] Field of Search ............. 521/162; 528/64, 68, 528/59

[56] References Cited

U.S. PATENT DOCUMENTS

| | | | |
|---|---|---|---|
| 3,824,266 | 7/1974 | Dietrich et al. | 521/162 |
| 3,903,126 | 9/1975 | Woerner et al. | 521/162 |
| 4,127,599 | 11/1978 | Moehring et al. | 521/162 |
| 4,147,714 | 4/1979 | Hetzel et al. | 260/453 AB |
| 4,210,728 | 7/1980 | Patton et al. | 528/64 |

FOREIGN PATENT DOCUMENTS 1568017  8/1964  Fed. Rep. of Germany.

*Primary Examiner*—H. S. Cockeram
*Attorney, Agent, or Firm*—Norbert M. Lisicki

[57] ABSTRACT

Reaction products of an organic polyisocyanate with a reactive diamine such as bis(4-aminocyclohexyl)methane and isophorone diamine, prepared at a temperature of between 135° C. and 200° C., are used to prepare polyurethanes useful for comfort cushioning applications such as automotive seating, furniture, mattresses, and large automotive body panels.

10 Claims, No Drawings

POLYURETHANES PRODUCED FROM AN ADDUCT OF AN ORGANIC POLYISOCYANATE AND CERTAIN AMINES

BACKGROUND OF THE INVENTION

1. Field of the Invention

The invention relates to the use of organic polyisocyanate adducts in the preparation of polyurethanes. More particularly, the invention relates to the use of the reaction product of from 0.5 percent by weight to 5 percent by weight of a reactive diamine such as bis(4-aminocyclohexyl)methane or isophorone diamine with organic polyisocyanates in the preparation of polyurethane foams and elastomers. The reaction product is prepared at a temperature between 135° C. and 200° C., preferably between 150° C. and 175° C.

2. Description of the Prior Art

The preparation of high resiliency polyurethane foams by the reaction of a polyol with a polyisocyanate employing a cross-linking agent is well known in the art. As a substitute for 4,4'-methylene-bis(2-chloroaniline), suspected of being carcinogenic, the use of bis(4-aminocyclohexyl)methane as a component in high resiliency polyurethane foam compositions has been described in U.S. Pat. No. 4,210,728. Toluene diisocyanate adducts of bis(4-aminocyclohexyl)methane and isophorone diamine prepared at a temperature of 130° C. to 200° C. have been disclosed in U.S. Pat. No. 4,147,714 for use in high quality lacquers which are weather resistant and stable to light. The reaction mixtures are disclosed as normally free from excess diisocyanate.

The prior art does not disclose high resiliency polyurethane foams or a way of making same with improved stability which avoids problems such as (1) skinning over of the resin blend by the reaction of the amine with atmospheric moisture and (2) poor stability during the foaming reaction whereby mold leaks cause collapse of the foam. Further, the prior art does not disclose high modulus polyurethane elastomers of improved properties of heat sag and modulus ratio made with the organic polyisocyanate adducts of the invention.

The present invention is directed toward novel reactive compositions which provide polyurethane free rise foams of improved stability, firmness and openness of cell structure; molded foams of improved ILD; and high modulus polyurethane elastomers of improved heat sag and modulus ratio.

SUMMARY OF THE INVENTION

The present invention relates to polyurethane compositions prepared employing certain reaction products of (a) an organic polyisocyanate of the formula $R'(NCO)_z$ wherein R' is a polyvalent organic radical which is either aliphatic, cycloaliphatic, aromatic or mixtures thereof, and z is an integer which corresponds with the valence of R' and is at least two, and (b) 0.5 percent by weight to 5 percent by weight of a reactive diamine selected from the group consisting of isophorone diamine and a compound of the formula:

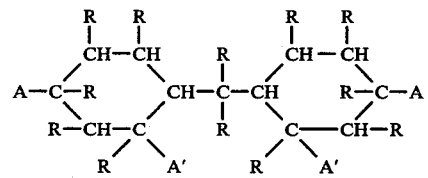

wherein R is H or alkyl of 1 to 4 carbon atoms and A and A' are $NH_2$ or H with the proviso that in each ring either A or A' is $NH_2$, not both, and when A or A' is $NH_2$, then the R attached to that carbon atom is H. The reaction product is prepared at a temperature of between 135° C. and 200° C. preferably 145° C. and 180° C. and more preferably 150° C. and 175° C. The polyurethane products have improved properties when compared with polyurethanes made with formulations of the prior art.

DESCRIPTION OF THE PREFERRED EMBODIMENTS

The reaction products of the invention are generally prepared by reacting the organic polyisocyanate, preheated to a temperature of between 130° C. to 200° C., with a continuous addition of from 0.5 percent by weight to 5.0 percent by weight reactive diamine. The temperature is maintained within the range 130° C. to 200° C. for a period of from 1 hour to 3 hours (which includes the continuous addition) and for an additional period to give a total time of 5 to 7 hours. The reaction is preferably stirred to avoid excessive solid formation.

Representative organic polyisocyanates employed in the preparation of the reaction products correspond to the following formula:

$$R'(NCO)_z$$

wherein R' is a polyvalent organic radical which is either aliphatic, cycloaliphatic, aromatic, or mixtures thereof, and z is an integer which corresponds to the valence of R' and is at least two. Representative of the organic polyisocyanates contemplated herein includes those mentioned, for example, in U.S. Pat. No. 4,210,728 from column 4, line 62 to column 5, line 16, incorporated herein by reference.

Preferably used as organic polyisocyanate are toluene diisocyanates, xylylene diisocyanate, hexamethylene-1,6-diisocyanate and other similar aliphatic or cyclic products of the aniline-formaldehyde condensation reaction and subsequent phosgenation reaction, methylene diphenyl diisocyanate, crude methylene diphenyl diisocyanate and the like. More preferably used is a mixture of 80 percent by weight 2,4-toluene diisocyanate and 20 percent by weight 2,6-toluene diisocyanate, a mixture of 65 percent by weight 2,4-toluene diisocyanate and 35 percent by weight 2,6-toluene diisocyanate, and 4,4'-diphenylmethane diisocyanate.

Useful reactive diamines used to prepare the reaction products of the invention are isophorone diamine and compounds of the formula:

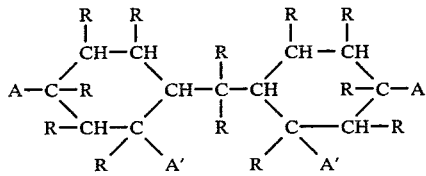

wherein R is H or alkyl of 1 to 4 carbon atoms and A and A' are NH₂ or H with the privisos that in each ring either A or A' is NH₂, not both and when A or A' is NH₂, then the R attached to that carbon atom is H. Representative amines include: bis(4-aminocyclohexyl)methane, bis(4-amino-3-methylcyclohexyl)methane, bis(4-amino-3,5-dimethylcyclohexyl)methane, bis(4-amino-2,3,5-trimethylcyclohexyl)methane, 1,1-bis(4-aminocyclohexyl)propane, 2,2-bis(4-aminocyclohexyl)propane, 1,1-bis(4-aminocyclohexyl)ethane, 1,1-bis(4-aminocyclohexyl)butane, 2,2-bis(4-aminocyclohexyl)butane, 1,1-bis(4-amino-3-methylcyclohexyl)ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)propane, 2,2-bis(4-amino-3,5-dimethylcyclohexyl)butane, 2-aminocyclohexyl-4-aminocyclohexylmethane, 4-aminocyclohexyl-4-amino-3-methylcyclohexylmethane, 4-amino-3,5-dimethylcyclohexyl-4-amino-3-methylcyclohexylmethane and 1-(4-aminocyclohexyl)-1-(4-amino-3-methylcyclohexyl)ethane. Most of the above products exist in stereoisomeric forms and any isomer ratio can be employed in the present invention. Preferably used are bis(4-aminocyclohexyl)methane and isophorone diamine.

In preparing the foam compositions of the invention, the above described reaction products are reacted with a polyol which will generally have an equivalent weight of from 500 to 5000 and a functionality of from 2 to 4. Suitable compounds include hydroxyl-terminated polyesters, polyoxyalkylenepolyether polyols, and alkylene oxide adducts of organic compounds having at least two reactive hydrogen atoms such as amines, acids of phosphorus, dithiols, etc.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, furmaric acid, glutaconic acid, β-butyl-α-ethylglutaric acid, α,β-diethylsuccinic acid, phthalic acid, isophthalic acid, terephthalic acid, hemimellitic acid, and 1,4-cyclohexanedicarboxylic acid. Any suitable polyhydric alcohol including both aliphatic and aromatic, may be used such as ethylene glycol, 1,3-propanediol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, 2-butene-1,4-diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenolic compounds such as 2,2-bis(4-hydroxyphenyl)propane, commonly known as Bisphenol A and hydroxyalkyl ethers of such phenolic compounds such as bis-2-hydroxyethyl ether of hydroquinone.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Any suitable polyoxyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from 2 to 6 carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a P₁O₅ equivalency of from about 72 percent to about 95 percent. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diaminotoluene; aliphatic polyamines such as ethylenediamine, 1,3-propylene diamine; 1,4-butylenediamine, and 1,3-butylenediamine, as well as substituted secondary derivatives thereof.

In addition to the above hydroxy-containing compounds, other compounds which may be employed include graft polyols. These polyols are prepared by the in situ polymerization product of a vinyl monomer or monomers in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 35 to about 600. The graft polyol has a molecular weight of at least about 500 and a viscosity of less than 40,000 cps. at 10 percent polymer concentration.

A more comprehensive discussion of the graft polyols and their method of preparation can be found in U.S. Pat. Nos. 3,383,351; 3,304,273; 3,652,639; and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542.

Preferably used as polyols are the following conventional polyols and graft polyols. The conventional polyols are prepared by reacting ethylene oxide with a polyhydric alcohol, having a hydroxyl number of from 20 to 40, and an ethylene oxide content of from 5 to 20 as a cap, or more if heteric. The graft polyols have a hydroxyl number of from 23 to 40 and are prepared by the in situ polymerization of from 5 parts to 15 parts styrene, 5 parts to 20 parts acrylonitrile and 65 parts to 90 parts, all by weight of a backbone polyol containing unsaturation; said backbone polyol having a hydroxyl number of 25 to 50 and prepared by the reaction of a mixture of propylene oxide, ethylene oxide and allylglycidyl ether with a polyhydric alcohol.

The adducts of the invention may be combined with other organic polyisocyanates mentioned in U.S. Pat. No. 4,210,728 to form foams of the invention.

The amount of organic polyisocyanate that is employed should generally be sufficient to provide about 0.9 to 1.2 isocyanate groups per hydroxyl plus amine groups.

Examples of chain extenders are aliphatic and/or araliphatic diols having 2 to 14, preferably 4 to 10 carbon atoms such as ethylene glycol, 1,10-decanediol, diethylene glycol, dipropylene glycol and preferably 1,4-butanediol, 1,6-hexanediol and bis(2-hydroxyethyl)-hydroquinone, triols such as glycerine and trimethylolpropane, and low molecular hydroxyl group-containing polyalkylene oxides based on ethylene oxide and/or propylene oxide and the above-referenced initiator molecules.

Secondary aromatic diamines can also be used as chain extenders. Examples include N,N'-dialkyl-substituted aromatic diamines which may be substituted by alkyl radicals at the aromatic nucleus having 1 to 20, preferably 1 to 4, carbon atoms in the N-alkyl radical such as N,N'-diethyl-, N,N'-di-secondary pentyl-, N,N'-di-secondary hexyl-, N,N'-di-secondary decyl-, N,N'-dicyclohexyl-p- or m-phenylenediamine, N,N'-dimethyl-, N,N'-diethyl-, N,N'-diisopropyl-, N,N'-di-secondary butyl-, N,N'-dicyclohexyl-4,4'-diaminodiphenylmethane and N,N'-di-secondary butylbenzidine. These chain extenders may be used in an amount between 2 and 50 parts per 100 parts of polyol, preferably 30 to 50 parts per 100 parts of polyol for the elastomers or elastomeric foams.

Other chain extenders include 3,3'5,5'-tetra-n-alkyl-substituted 4,4'-diaminodiphenylmethane such as 3,3',5,5'-tetramethyl-, -tetraethyl-, and -tetra-n-propyl-4,4'-diaminodiphenylmethane. Mixtures of the diaminodiphenylmethanes and the above-referenced chain extenders, in a mole ratio of 75:25 to 25:75, preferably approximately 50:50 corresponding to a weight percent relative to polyol of 2 to 50 and particularly for cellular materials of 2 to 10, have proven to work well.

In addition to the previously described ingredients, other ingredients as catalysts, surfactants, blowing agents, fillers, pigments and the like can be included in the preparation of the foams. Surfactants which can be used are the conventional surfactants used in urethane preparation such as the polysiloxanes or the alkyelne oxide adducts of organic compounds containing reactive hydrogen atoms such as the ethylene oxide adducts of alcohols, glycols and phenols. Generally, the surfactants are employed in amounts ranging from about 0.01 part to 5 parts by weight per 100 parts of polyol.

Conventional fillers for use herein includes for example aluminum silicate, calcium silicate, magnesium silicate, calcium carbonate, barium sulfate, calcium sulfate, glass fibers, carbon black and silica. The filler if used is normally present in an amount ranging from about 5 parts by weight to 50 parts by weight or up to 100 parts by weight for foams per 100 parts of polyol. Useful fillers for elastomers include milled glass fiber, chopped glass, mineral fibers, mica, ground glass and their surface treated forms.

A pigment which can be used herein can be any conventional pigment heretofor disclosed in the art such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

Conventional blowing agents such as water, halohydrocarbons, hydrocarbons and the like, can be employed herein in their conventional mode. Particularly preferred blowing agent for the preparation of high resilient polyurethane foams are water and trichloromonofluoromethane.

Any of the catalysts employed in the preparation of polyurethane foam can be employed in the subject invention. Representative of these catalysts include the tertiary amine catalysts such as diethylenetriamine, ketimine, tetramethylene diamine, triethylenediamine, tetramethylenediamine, tetramethylguanidine, trimethylpiperazine and the metalo-organic salt catalysts which are polyvalent metal salts of an organic acid having up to about 18 carbon atoms and being void of active hydrogen atoms. The organo portion of the salt may be either linear or cyclic or saturated or unsaturated. Generally, the polyvalent metal has a valence from about 2 to 4. Typical of these salts include: stannous acetate, stannous butyrate, stannous 2-ethylhexoate, stannous laurate, stannous oleate, stannous stearate, stannous octoate, lead cyclopentanecarboxylate, cadmium cyclohexanecarboxylate, lead naphthenate, lead octoate, cobalt naphthenate, zinc naphthenate, bis(phenylmercury)dodecyl succinate, phenylmercuric benzoate, cadmium naphthenate, dibutyltin dilaurate and dibutyltin-di-2-ethylhexoate. Generally these catalysts will be employed in amounts ranging from about 0.01 part to 7.5 parts by weight based on the weight of the polyol.

In preparing the foams of the present invention, any general procedure conventionally utilized for the preparation of urethane foams can be practiced. Generally speaking, such procedure entails the mixing together of ingredients with agitation until the foaming reaction commences. After foam formation ceases, the resulting product is then cured at a temperature ranging from about 25° C. to 150° C. for about 5 minutes to 24 hours.

For more complete understanding of the present invention, reference is made to the following non-limiting examples wherein all parts are by weight unless otherwise noted. In the examples which follow, the following abbreviations are employed.

Polyol A is a polyether polyol prepared by the reaction of ethylene oxide with the propylene oxide adduct of glycerine, said polyol having a hydroxyl number of 35 and an ethylene oxide content of about 16 percent by weight.

Polyol B is a graft polyol having a hydroxyl number of about 27 to 28 prepared by the in situ polymerization of 10.5 percent by weight styrene, 10.5 percent by weight acrylonitrile and 79 percent by weight of a polyol containing unsaturation, said polyol having a hydroxyl number of 35 and prepared by capping with ethylene oxide a heteric adduct of a mixture of propylene oxide and allylglycidyl ether with glycerine and propylene glycol.

Polyol C is a graft polyol having a hydroxyl number of about 26 to 27 prepared by the in situ polymerization of about 12 percent by weight styrene, about 8 percent by weight acrylonitrile and 80 percent by weight of a polyol containing unsaturation, said polyol having a hydroxyl number of 33 and prepared by capping with ethylene oxide a heteric adduct of a mixture of propylene oxide and allylglycidyl ether with glycerine and propylene glycol.

Polyol D is a polyether polyol having an average molecular weight of approximately 4,120 prepared by reacting ethylene oxide with a propylene oxide adduct of trimethylolpropane.

Catalyst PC is potassium carbonate.

Catalyst E is a 33 percent solution of triethylene diamine in dipropylene glycol.

Catalyst $E_1$ is a 25 percent solution of triethylenediamine in ethylene glycol.

Catalyst $E_2$ is a 25 percent solution of triethylenediamine in 1,4-butanediol.

Catalyst F is a catalyst commercially available as NIAX®A-107.

Catalyst $F_1$ is a catalyst commercially available as NIAX®A-1.

Catalyst G is a tertiary amine catalyst commercially available as THANCAT®DM-70.

Catalyst H is dibutyltin dilaurate.

Component I is a 5 centistoke dimethylsilicone fluid.

Component $I_1$ is a silicone-glycol copolymer.

Isocyanate J is an isocyanate blend of 80 weight percent TDI and 20 weight percent MDI used at an index of 105.

Isocyanate K is the bis(4-aminocyclohexyl)methane-toluene diisocyanate adduct of this invention described below in Examples 1-4.

Isocyanate $K_1$ is the bis(4-aminocyclohexyl)methane-toluene diisocyanate adduct of this invention described below in Examples 5-7.

Isocyanate $K_2$ is the isophorone diamine-toluene diisocyanate adduct of this invention described below in Examples 8 and 9.

Isocyanate L is the bis(4-aminocyclohexyl)methane-4,4'-diphenylmethane diisocyanate adduct of this invention described in Examples 10 and 11.

Isocyanate M is toluene diisocyanate.

Component N is bis(4-aminocyclohexyl)methane.

Component O is dibutyl tin dilaurate.

Component P is a surfactant silicone glycol copolymer.

Isocyanate Q is 90 percent by weight 80/20 TDI and 10 percent by weight polymeric MDI.

Isocyanate R is a liquid carbodiimide-modified diphenylmethane diisocyanate with a free NCO content of 29.3 percent.

Isocyanate S is a modified liquid diphenylmethane diisocyanate having a free NCO content of 23 percent prepared by reacting diphenylmethane diisocyanate mixture with tripropylene glycol and dipropylene glycol.

EG is ethylene glycol.
DB is 1,4-butanediol.

EXAMPLES 1-4 AND COMPARISON EXAMPLE A

[Bis(4-aminocyclohexyl)methane-toluene diisocyanate adduct]

A toluene diisocyanate adduct was prepared by the following process: 13.25 parts of bis(4-aminocyclohexyl)methane were gradually added under vigorous agitation to 500 parts of toluene diisocyanate at a temperature of 150° C. over a period of 2.5 hours. Then, the temperature was maintained at 150° C. for an additional 3 hours to produce a toluene diisocyanate adduct having an isocyanate content of 44.3 percent by weight, as determined by dibutylamine titration, and a viscosity of 32 centipoise at 25° C.

The adduct was a homogenous dark red transparent liquid.

A polyurethane foam formulation comprising the components listed in Table I was prepared.

TABLE I

| Component | Comparison Example A | Parts by Weight Examples | | | |
| --- | --- | --- | --- | --- | --- |
| | | 1 | 2 | 3 | 4 |
| A | 70 | 70 | 70 | 70 | 70 |
| B | 30 | 30 | 30 | 30 | 30 |
| Water | 4.0 | 4.0 | 4.0 | 4.0 | 4.0 |
| PC | 0.02 | 0.02 | 0.02 | 0.02 | 0 |
| E | 0.45 | 0.45 | 0.45 | 0.45 | 0.45 |
| F | 0.3 | 0.3 | 0.3 | 0.3 | 0.3 |
| G | 0.3 | 0.3 | 0.3 | 0.3 | 0.3 |
| I | 0 | 0 | 0.06 | 0.01 | 0.06 |
| $I_1$ | 1.5 | 1.5 | 0 | 0 | 0 |
| J | 49.7 | 0 | 0 | 0 | 0 |
| K | 0 | 50.7 | 50.7 | 50.7 | 50.7 |

Foams were prepared from these foam formulations using an Admiral low pressure foam machine and an in-mold time of six minutes. On demolding, the foams were crushed to open the cells, then post cured at 250° F. for thirty minutes. The foams were in the form of molded blocks 20 by 20 by 5.5 inches.

The properties of the foams are presented in Table II.

TABLE II

| Property | Comparison A | Examples | | | |
| --- | --- | --- | --- | --- | --- |
| | | 1 | 2 | 3 | 4 |
| Density, pcf. | 1.79 | 1.71 | 1.81 | 1.81 | 1.82 |

TABLE II-continued

| Property | Comparison A | Examples 1 | 2 | 3 | 4 |
|---|---|---|---|---|---|
| Tensile Strength psi | 18.8 | 17.7 | 19.8 | 19.3 | 18.2 |
| Elongation, % | 148 | 112 | 138 | 132 | 124 |
| Tear, pi (2 in/min) | 1.23 | 1.24 | 1.37 | 1.48 | 1.31 |
| ILD, lb/50 in$^2$ Sample thickness index | 5.25 | 5.32 | 5.40 | 5.38 | 5.39 |
| 25% | 23.7 | 27.5 | 32.7 | 30.8 | 31.5 |
| 65% | 73.7 | 78.4 | 93.5 | 89.9 | 89.1 |
| Guide Factor | 13.2 | 16.1 | 18.1 | 17.0 | 17.3 |
| Sag Factor | 3.11 | 2.85 | 2.86 | 2.92 | 2.82 |
| Recovery, % | 76.2 | 75.5 | 74.2 | 75.0 | 76.7 |
| Compression Set | | | | | |
| 50% | 15.5 | 17.1 | 15.9 | 14.1 | 10.8 |
| 75% | 12.3 | 31.2 | 30.6 | 25.1 | 10.8 |
| 90% | 51.7 | 79.8 | 78.7 | 81.2 | 42.7 |
| Humid Aged 5 hours at 250° F. Compression Set | | | | | |
| 50% | 15.5 | 17.1 | 15.9 | 14.1 | 10.8 |
| 75% | 12.3 | 31.2 | 30.6 | 25.1 | 10.8 |
| 90% | 51.7 | 79.8 | 78.7 | 81.2 | 47.7 |
| Heat aged 22 hours at 284° F. Tensile strength, psi | 20.2 | 22.7 | 25.9 | 24.0 | 20.5 |
| of original, % | 107 | 128 | 131 | 124 | 113 |
| Air Flow at 0.5" water, cfm. | 0.82 | 0.88 | 0.93 | 1.44 | 0.88 |

All of the examples 1–4 and the comparison example met the requirements of the flammability test MVSS 302. The foams of the invention show improved load bearing characteristics.

EXAMPLES 5–7 AND COMPARISON EXAMPLES B–E

Other examples of formulations containing toluene diisocyanate adducts of bis(4-aminocyclohexyl)methane and foams prepared therefrom are shown below in Table III as Examples 5–7. Comparison Examples B–E show foams which collapsed. The foams were made with bis(4-aminocyclohexyl)methane and toluene diisocyanate or a blend of TDI and polymeric MDI employing a one-shot method rather than forming an adduct. The mold release agent used for Examples 6 and 7 and Comparison Examples D and E was P-80-C-O, a wax in a solvent made by Chem Trend.

TABLE III

| | Parts by Weight | | | | | | |
|---|---|---|---|---|---|---|---|
| | Examples | | | Comparison Examples | | | |
| Component | 5 | 6 | 7 | B | C | D | E |
| A | 58.5 | 60 | 60 | 58.5 | 58.5 | 58.5 | 58.5 |
| C | 40 | 40 | 40 | 40 | 40 | 40 | 40 |
| N | — | — | — | 1.5 | 1.5 | 1.5 | 1.5 |
| Water | 3.4 | 3.4 | 3.4 | 3.4 | 3.4 | 3.4 | 3.4 |
| E | 0.30 | 0.30 | 0.30 | 0.30 | 0.30 | 0.30 | 0.30 |
| F | 0.15 | 0.15 | 0.15 | 0.15 | 0.15 | 0.15 | 0.15 |
| G | 0.35 | 0.35 | 0.35 | 0.35 | 0.35 | 0.35 | 0.35 |
| O | 0.01 | 0.01 | 0.01 | 0.01 | 0.01 | 0.01 | 0.01 |
| P | 2.0 | 2.0 | 2.0 | 2.0 | 2.0 | 2.0 | 2.0 |
| M | | | | 41.1 | | 41.1 | |
| Q | | | | | 42.7 | | 42.7 |
| K$_1$ | 43.9 | 43.5 | 43.5 | | | | |
| Index | 105 | 105 | 105 | 105 | 105 | 105 | 105 |
| Mold Temp. °F. | | 120 | 120 | | | 120 | 120 |
| Cure Temp. °F. | | 200 | 200 | | | 200 | 200 |
| Cure Time, min. | | 6 | 6 | | | 6 | 6 |
| Demold Temp. °F. | | 148 | 149 | | | 150 | 147 |
| Rise Time, top of cups, sec. | 28 | | | 18 | 22 | | |
| Rise Time, gas off, sec. | — | | | — | — | | |
| Collapse Time, sec. | — | | | 48 | 60 | | |
| Foam Height, mm | 207 | | | 45 | 33 | | |
| Foam Weight, g | 150 | 146 | 116 | 145 | 148 | 136 | 130 |
| Remarks* | GA MC SPMT | GA GS GCAD | GA GS GCAD | C | C | SSD SUAD TATC | SSD SUAD TATC |

*GA = good appearance
GCAD = good cure at demold
SPMT = slightly pock marked top
SUAD = slightly undercured at demold
C = collapse
GS = good surface
MC = medium size cells
SSD = slight surface defect
TATC = tear at two corners Example 5 and Comparison Examples B and C were hand mixed free rise foams made by standard procedures. The foam stability was improved when compared with the comparison foam, as shown by free rise cup visual observation.

Examples 6 and 7 and Comparison Examples D and E were hand mixed molded foams, 9 inches by 2 inches by 2 inches made by standard procedures.

EXAMPLES 8 AND 9

(Isophorone diamine-toluene diisocyanate adduct)

A toluene diisocyanate adduct was prepared by the following process: 23.8 parts of isophorone diamine were reacted with 1000 parts toluene diisocyanate over a period of 6.0 hours and at a temperature between 130° C. and 175° C. according to the general procedure of Examples 1–4 to produce a one-phase dark orange transparent liquid having an isocyanate content of 44.3 percent by weight.

Polyurethane foams were prepared employing this adduct. The specific formulations and properties of the foams are presented in Table IV below.

TABLE IV

| Component, pbw | Example 8 | Example 9 |
|---|---|---|
| A | 58.5 | 60.0 |
| C | 40.0 | 40.0 |
| Water | 3.4 | 3.4 |
| E | 0.3 | 0.3 |
| F | 0.15 | 0.15 |
| G | 0.35 | 0.35 |
| O | 0.01 | 0.01 |
| $I_1$ | 2.0 | 2.0 |
| $K_2$ | 43.4 | 43.4 |
| Index | 105 | 105 |
| Mold temperature °F. | | 120 |
| Cure temperature °F. | | 200 |
| Cure time - minutes | | 6 |
| Mold release | | P-80-C-0 |
| Demold temperature °F. | | 149 |
| rise time, top of cup, seconds | 27 | |
| rise time, gas off, seconds | 92 | |
| foam height - mm | 207 | |
| foam weight - g | 148 | 145 |
| remarks* | GA | GA |
| | MC | GS |
| | SPMT | GCAD |

*GA = good appearance
GS = good surface
GCAD = good cure at demold
MC = medium size cells
SPMT = slightly pock marked top Example 8 was hand mixed free rise foam made by the procedure of Example 5.

Example 9 was a hand mixed molded foam made by the procedure of Examples 6 and 7.

EXAMPLES 10 and 11 AND COMPARISON EXAMPLES F-I

Examples 10 and 11 illustrate the use of MDI adducts to prepare polyurethane elastomers. Example 10 utilizes ethylene glycol as a chain extender whereas Example 11 utilizes 1,4-butanediol as a chain extender. Comparison Examples F, G, H, and I show the effects of using two commercially available isocyanate adducts instead of the MDI adduct prepared in accordance with this invention.

The MDI adduct is prepared by the following process: 4.2 parts of bis(4-aminocyclohexyl)methane are gradually added under vigorous agitation to 100 parts of 4,4'-diphenylmethane diisocyanate, at a temperature of 150° C. over a period of 45 minutes. Then, the temperature is maintained at 150° C. for an additional 2 hours to produce a MDI adduct having an isocyanate content of 28.8 percent by weight, as determined by dibutylamine titration, and a viscosity of 1580 centipoise at 25° C.

The formulations and physical properties are summarized in Table IV. A review of the data shows that elastomers prepared with the modified MDI adducts of the subject invention are more resistant to heat sag, and have a better modulus ratio.

TABLE V

| | Examples | | | Comparison Examples | | |
|---|---|---|---|---|---|---|
| Formulation | 10 | 11 | F | G | H | I |
| Component D, pbw | 100 | 100 | 100 | 100 | 100 | 100 |
| EG | 40 | — | 40 | 40 | — | — |
| BD | — | 40 | — | — | 40 | 40 |
| $E_1$ | 2 | — | 2 | 2 | — | — |
| $E_2$ | — | 2 | — | — | — | — |
| H | 0.06 | 0.06 | 0.06 | 0.06 | 0.06 | 0106 |
| L | 76.75 | 54.95 | — | — | — | — |
| R | 76.75 | 54.95 | 147.2 | — | 104.5 | — |
| S | — | — | — | 188.5 | — | 133.8 |
| Physical Properties | | | | | | |
| Density, pcf. | 57.0 | 55.8 | 59.2 | 61.1 | 63.8 | 60.5 |
| Tensile, psi. | 3160 | 2790 | 3560 | 3655 | 3210 | 3175 |
| Elongation, % | 25 | 70 | 53 | 28 | 75 | 85 |
| Hardness, Shore D | 61-61 | 56-56 | 61-61 | 65-65 | 53-53 | 60-60 |
| Graves tear, pi. | 490 | 535 | 676 | 821 | 555 | 790 |
| Heat sag at 325° F., in. | 0.44 | 1.28 | 1.21 | (a) | 2.14 | (a) |
| Tangential modulus, K psi. | | | | | | |
| −20° F. | 163.7 | 132.4 | 168.2 | 252.6 | 159.8 | 251.8 |
| 72° F. | 100.6 | 67.1 | 99.6 | 147.6 | 75.7 | 103.7 |
| 158° F. | 66.1 | 31.0 | 61.8 | 68.9 | 28.4 | 17.8 |
| Modulus ratio −20/158° F. | 2.48 | 4.27 | 2.72 | 3.67 | 5.63 | 14.2 |

(a) Heat sag over 3 inches

The embodiments of the invention in which an exclusive property or privilege is claimed are defined as follows:

1. A polyurethane molded foam or elastomer product prepared in the presence of or in the absence of a blowing agent by the reaction of a polyol with an organic polyisocyanate composition comprising the reaction product of (a) an organic polyisocyanate and (b) 0.5 percent by weight to 5 percent by weight of a reactive diamine selected from the group consisting of
   (I) isophorone diamine and
   (II) a reactive diamine of the formula:

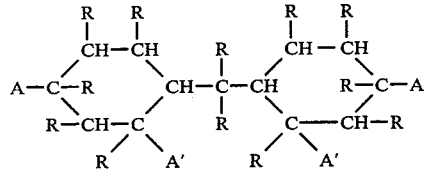

wherein R is H or alkyl of 1 to 4 carbon atoms and A and A' are $NH_2$ or H with the proviso that in each ring either A or A' is $NH_2$, not both, and when A or A' is $NH_2$, then the R attached to that carbon atom is H,
said reaction product prepared at a temperature of between 135° C. and 200° C.

2. The product of claim 1 wherein the diamine is bis(4-aminocyclohexyl)methane.

3. The product of claim 1 wherein the diamine is isophorone diamine.

4. The product of claim 1 wherein the organic polyisocyanate is toluene diisocyanate.

5. The product of claim 1 wherein the diamine is bis(4-aminocyclohexyl)methane and the organic polyisocyanate is toluene diisocyanate.

6. The product of claim 1 wherein the diamine is isophorone diamine and the organic polyisocyanate is toluene diisocyanate.

7. The product of claim 2 wherein the blowing agent is water.

8. The product of claim 2 wherein the polyol has an equivalent weight of from 500 to 5000 and a functionality of from 2 to 4.

9. The product of claim 1 wherein the diamine is bis(4-aminocyclohexyl)methane and the organic polyisocyanate is 4,4'-diphenylmethane diisocyanate.

10. The composition of claim 1 prepared in the presence of a blowing agent.

* * * * *